US008743786B2

(12) United States Patent
Johansson et al.

(10) Patent No.: US 8,743,786 B2
(45) Date of Patent: Jun. 3, 2014

(54) POWER BACKOFF FOR MULTI-CARRIER UPLINK TRANSMISSIONS

(75) Inventors: Klas Johansson, Sundbyberg (SE); Torgny Palenius, Barsebäck (SE); Kai-Erik Sunell, Bromma (SE); Anders Wallen, Ystad (SE)

(73) Assignee: Unwired Planet, LLC, Reno, NV (US)

( * ) Notice: Subject to any disclaimer, the term of this patent is extended or adjusted under 35 U.S.C. 154(b) by 216 days.

(21) Appl. No.: 13/256,132

(22) PCT Filed: Dec. 28, 2009

(86) PCT No.: PCT/SE2009/051503
§ 371 (c)(1),
(2), (4) Date: Sep. 12, 2011

(87) PCT Pub. No.: WO2010/107360
PCT Pub. Date: Sep. 23, 2010

(65) Prior Publication Data
US 2012/0008563 A1 Jan. 12, 2012

Related U.S. Application Data

(60) Provisional application No. 61/160,786, filed on Mar. 17, 2009.

(51) Int. Cl.
*H04W 4/00* (2009.01)
(52) U.S. Cl.
USPC .......................................................... 370/328
(58) Field of Classification Search
USPC .................. 370/250–252, 328; 455/126–128
See application file for complete search history.

(56) References Cited

U.S. PATENT DOCUMENTS

| 6,167,270 | A | 12/2000 | Rezaiifar et al. |
| 6,735,247 | B2 * | 5/2004 | Lundby .......................... 375/227 |
| 6,795,716 | B2 * | 9/2004 | Gerogiokas ................. 455/562.1 |
| 7,095,900 | B2 * | 8/2006 | Schwartz et al. ............. 382/251 |
| 8,032,772 | B2 * | 10/2011 | Allarey et al. ................. 713/322 |
| 8,386,820 | B2 * | 2/2013 | Diab .............................. 713/320 |
| 2004/0162097 | A1 * | 8/2004 | Vijayan et al. ................. 455/522 |
| 2004/0252658 | A1 | 12/2004 | Hosein et al. |
| 2006/0068830 | A1 * | 3/2006 | Klomsdorf et al. ........... 455/522 |
| 2007/0015476 | A1 * | 1/2007 | Akbar Attar et al. ....... 455/127.1 |

(Continued)

FOREIGN PATENT DOCUMENTS

EP 1928114 A1 6/2008

*Primary Examiner* — Asad Nawaz
*Assistant Examiner* — Syed S Ali
(74) *Attorney, Agent, or Firm* — Nixon & Vanderhye P.C.

(57) ABSTRACT

Teachings presented herein provide reduced computational complexity and/or memory requirements for a mobile terminal to determine the power backoff required for a multi-carrier uplink signal. In particular, the mobile terminal determines whether its power headroom falls below a pre-defined power headroom threshold, indicating that it is headroom limited. If so, it quantizes power allocated to each carrier of the multi-carrier uplink signal according to a pre-defined quantization policy. In doing so, the mobile terminal thereby reduces the possible configurations that may be selected for the multi-carrier uplink signal. Thus, in one embodiment, the mobile terminal stores the required backoff in a look-up table for only the configurations that may be selected when the mobile terminal is headroom limited. This relieves the memory requirements of the mobile terminal as compared to storing the required backoff for all possible configurations of the multi-carrier uplink signal.

23 Claims, 5 Drawing Sheets

(56) References Cited

U.S. PATENT DOCUMENTS

| | | | |
|---|---|---|---|
| 2007/0091815 A1* | 4/2007 | Tinnakornsrisuphap et al. | 370/252 |
| 2008/0025254 A1* | 1/2008 | Love et al. | 370/329 |
| 2008/0072079 A1* | 3/2008 | Bieswanger et al. | 713/300 |
| 2009/0097702 A1* | 4/2009 | Rhoads | 382/100 |
| 2009/0268707 A1* | 10/2009 | Pani et al. | 370/345 |
| 2009/0290559 A1* | 11/2009 | Pelletier et al. | 370/336 |
| 2010/0157895 A1* | 6/2010 | Pani et al. | 370/328 |
| 2011/0009156 A1* | 1/2011 | Goodwin et al. | 455/522 |
| 2011/0080838 A1* | 4/2011 | Larsson et al. | 370/252 |
| 2012/0082041 A1* | 4/2012 | Damnjanovic et al. | 370/252 |
| 2012/0099453 A1* | 4/2012 | Sagfors et al. | 370/252 |

* cited by examiner

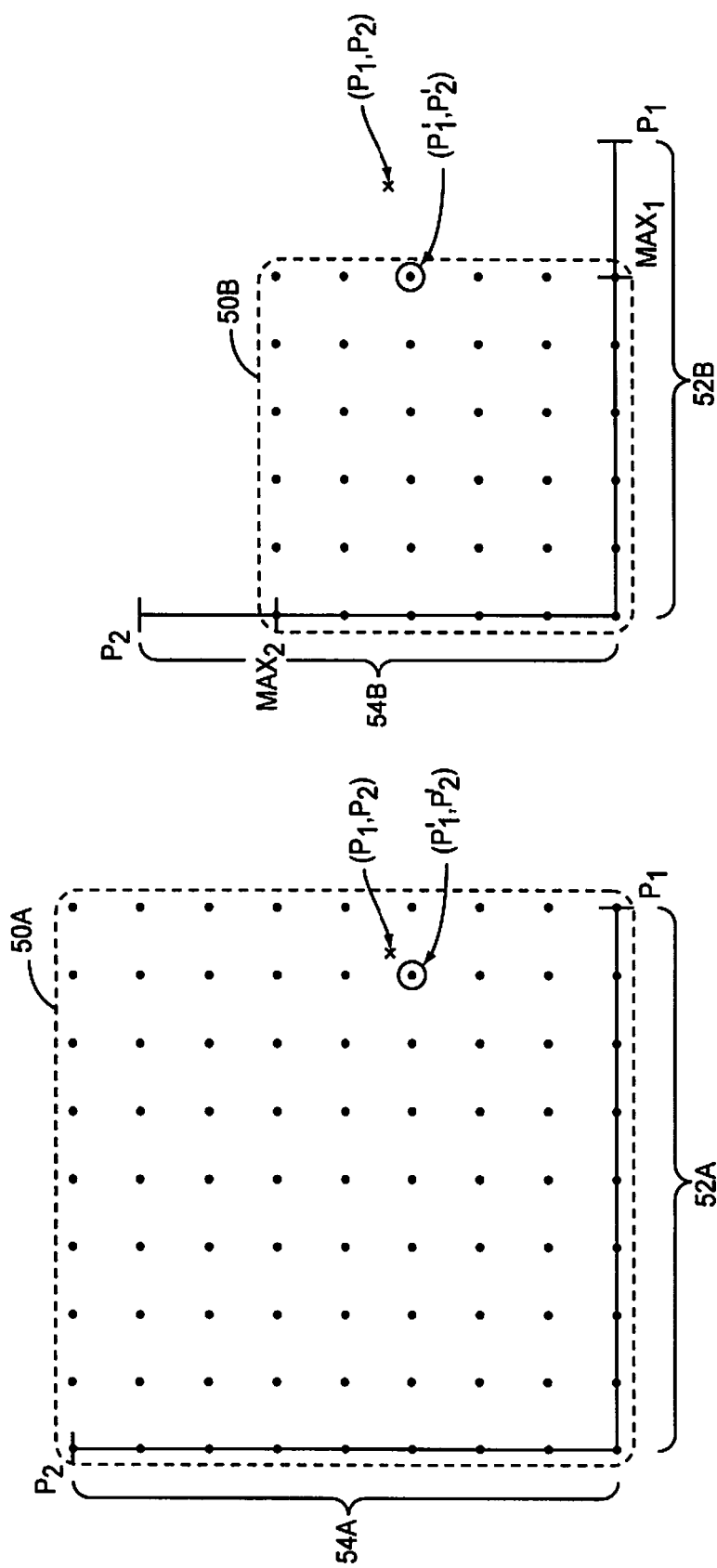

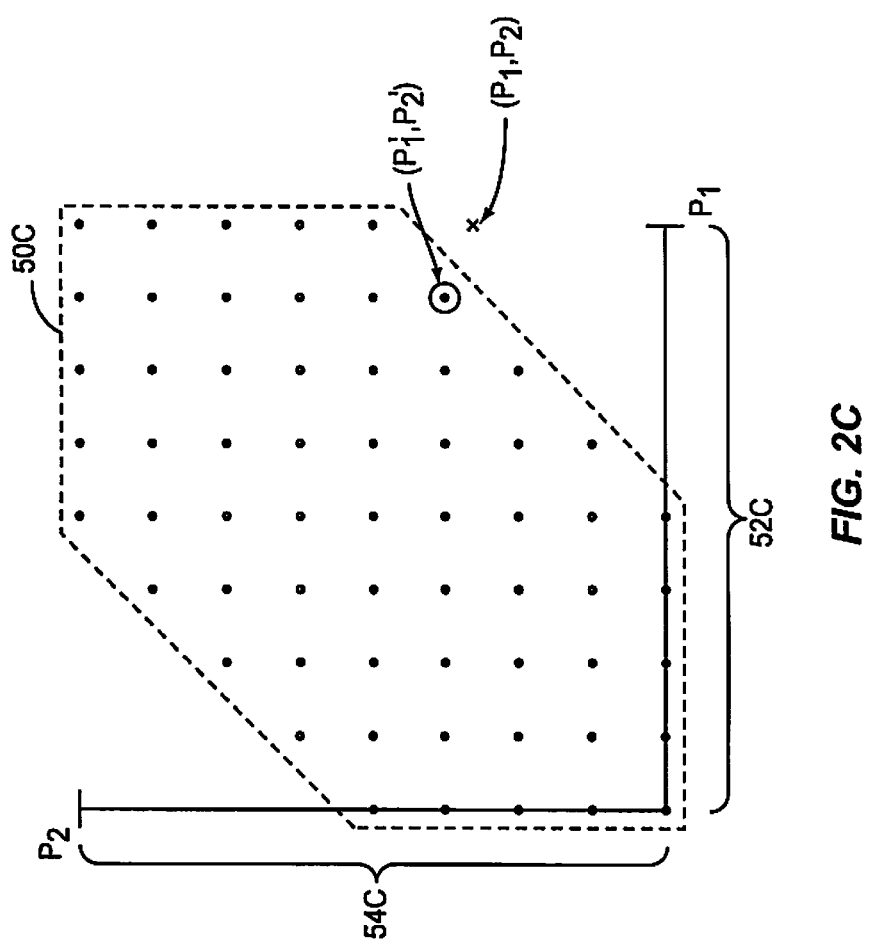

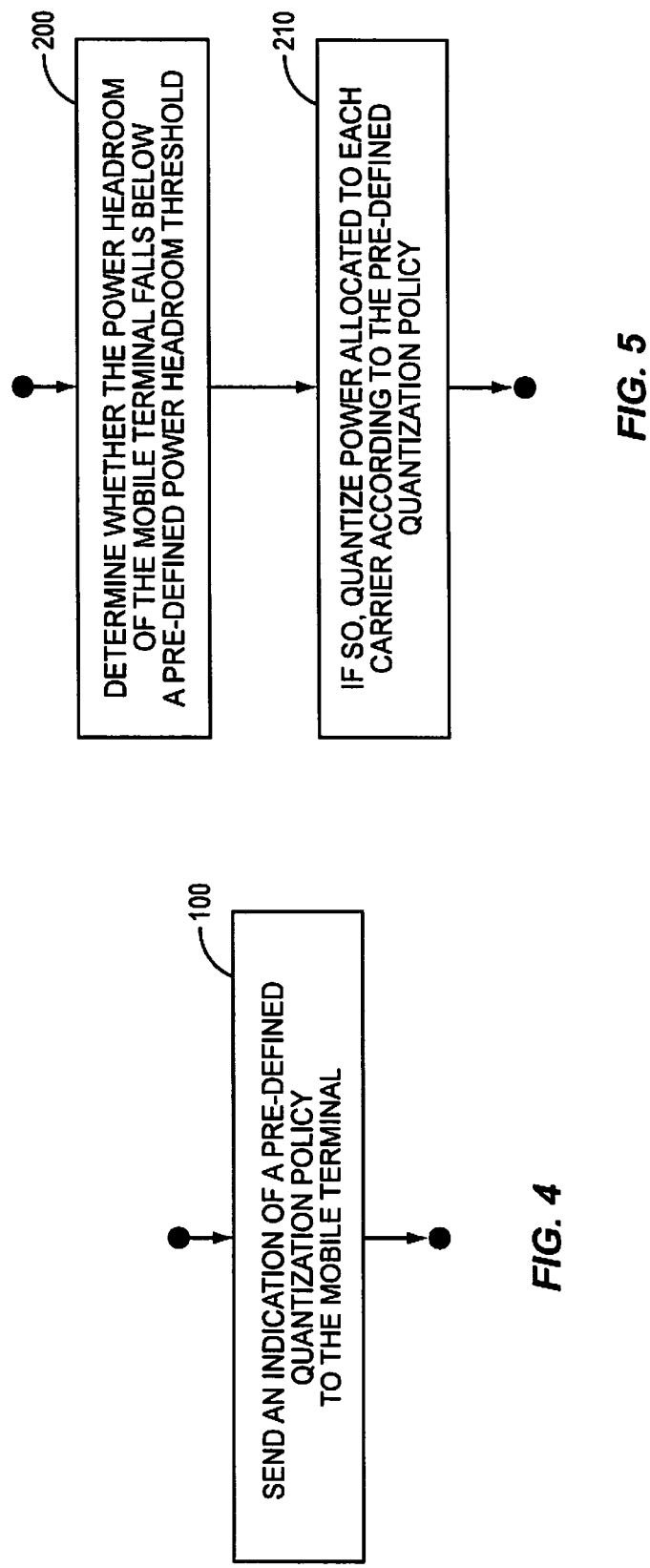

POWER BACKOFF FOR MULTI-CARRIER UPLINK TRANSMISSIONS

TECHNICAL FIELD

The present invention relates generally to multi-carrier uplink transmissions, and particularly to reducing the computational complexity and/or memory requirements of power backoff for multi-carrier uplink transmissions.

BACKGROUND

In practice, a wireless communication transmitter emits energy in frequency regions other than those intended for the transmission. This emission, or leakage, of energy into nearby frequency regions generally relates to the operating point of the transmitter□ s power amplifier. The level of energy leaked, for example, increases when the power amplifier operates in its non-linear region, at higher power levels, due to intermodulation distortion. To circumvent this, it would be possible to design the transmitter circuitry to improve the linearity of the power amplifier. This will however come at the expense of significantly reduced efficiency, and consequently significantly reduced battery time. Accordingly, an effective method for achieving a pre-determined limitation on the amount of energy leaked entails reducing or □ backing off□ the maximum transmit power on the intended transmit channel from its nominal value.

The amount by which the maximum transmit power must be backed off, while also accounting for amplifier efficiency, depends on properties of the transmitted waveform (e.g., the modulation, spreading code, spreading factor, gain factors, or similar configurations of the waveform specified in one or more transport formats selected for the transmission). For some signals, these properties can be well quantified in terms of Cubic Metric (CM) or Peak-to-Average Power Ratio (PAPR), as described in e.g. 3GPP Technical specification TS25.101, Release 8. Such quantities, however, can be costly in terms of processing resources to compute quickly, making estimation of the required back-off upon a dynamic change in the properties of the transmitted waveform particularly problematic.

With various known approaches addressing this issue for single-carrier transmission, PAPR or CM can be pre-computed for all possible configurations of the transmitted waveform and the corresponding required back-off stored in a look-up table. This approach, however, proves more and more impracticable as the number of configuration possibilities increases, due to the size of the required look-up table. In multi-carrier transmission, for example, two or more separately modulated carriers, each occupying distinct frequency regions, are transmitted simultaneously. See, e.g., multi-carrier operation outlined for inclusion in 3GPP Rel.9, □ Dual-Cell HSUPA,□ 3GPP Work Item Description, RP-090014. When the configuration for each carrier is selected independently from that of the other carriers, the number of possible configurations of the compound waveform (and thereby the size of the required look-up table) may be several orders of magnitude greater than in single-carrier transmission.

SUMMARY

Teachings presented herein provide reduced computational complexity and/or memory requirements for a mobile terminal to determine the power backoff required for multi-carrier uplink transmissions. The teachings restrict the number of possible configurations of the multi-carrier uplink transmission when backoff is required by quantizing power allocated to each carrier when the mobile terminal is headroom limited. The headroom, or power headroom, as used in the present invention, is a measure of the available transmit power for data traffic in a mobile terminal, typically the difference between the maximum allocated power and the power currently allocated to necessary control signaling.

In particular, a mobile terminal as taught herein includes one or more antennas configured to transmit a multi-carrier uplink signal to a base station. The mobile terminal also includes one or more processing circuits configured to determine whether a power headroom of the mobile terminal falls below a pre-defined power headroom threshold, indicating that the mobile terminal is headroom limited. If the mobile terminal is headroom limited, the one or more processing circuits quantize power allocated to each carrier of the multi-carrier uplink signal according to a pre-defined quantization policy. Quantized according to the pre-defined quantization policy, the power allocated to each carrier may only have certain values, such that only some of the possible configurations for that carrier are allowed when the mobile terminal is headroom limited. The quantization policy may impose restrictions on the signals on each carrier individually, or on the combination of signals on two or more carriers.

Thus, in one embodiment, the mobile terminal stores the required backoff in a look-up table for only the combinations of configurations that may be selected for the multi-carrier uplink signal when the mobile terminal is headroom limited. In doing so, the memory requirements of the mobile terminal are reduced relative to storing the required backoff for all possible combinations of configurations for the carriers.

The base station in some embodiments is configured to send an indication of the pre-defined quantization policy, the pre-defined power headroom threshold, or both to the mobile terminal. The base station may send such indications to the mobile terminal over a dedicated channel or a broadcast channel. Moreover, different base stations may be configured with different quantization policies depending on, for example, the radio environment at each base station. To mitigate inconsistent behavior when the mobile terminal moves between different base stations, therefore, the mobile terminal may be pre-configured with, or sent an indication of, a default quantization policy.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 2A-2C illustrate examples of a pre-defined quantization policy according to various embodiments of the present invention.

FIG. 4 is a logic flow diagram illustrating a method implemented by a base station for receiving a multi-carrier uplink signal according to one embodiment of the present invention.

FIG. 5 is a logic flow diagram illustrating a method implemented by a mobile terminal for transmitting a multi-carrier uplink signal according to one embodiment of the present invention.

DETAILED DESCRIPTION

Figure 1:
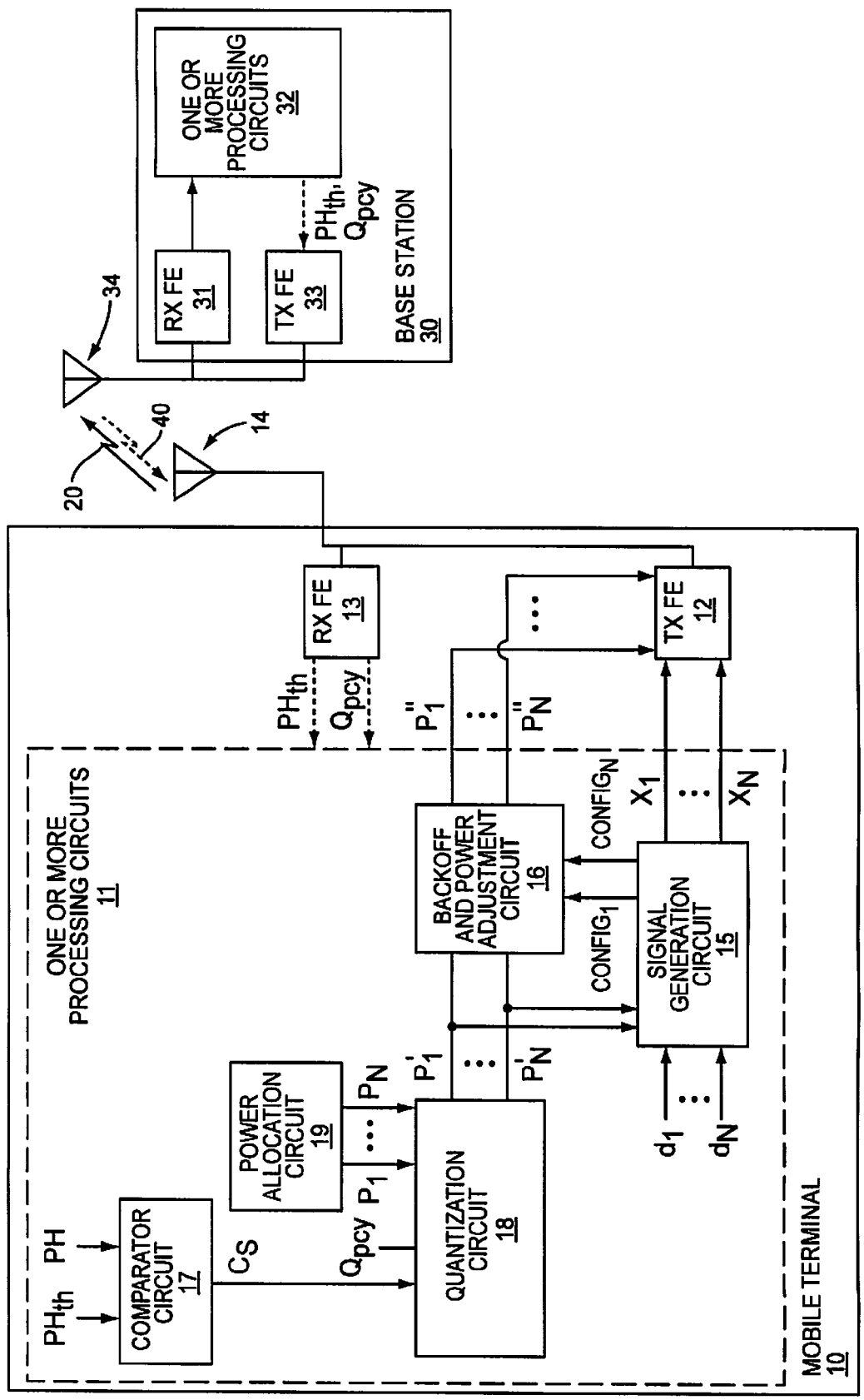
FIG. 1 is a block diagram illustrating a mobile terminal configured to transmit a multi-carrier uplink signal to a base station according to one embodiment of the present invention.

FIG. 1 illustrates one embodiment of a mobile terminal 10 configured to transmit a multi-carrier uplink signal 20 to a base station 30. The mobile terminal 10 includes one or more processing circuits 11, a transmitter front-end 12, a receiver front-end 13, and one or more antennas 14.

The one or more processing circuits 11 are shown in FIG. 1 for illustrative purposes as including a signal generation circuit 15, a backoff and power adjustment circuit 16, a comparator circuit 17, a quantization circuit 18, and a power allocation circuit 19. The signal generation circuit 15 selects a configuration $\text{config}_1 \ldots \text{config}_N$ for each of N carriers, N≥2. The configuration of a carrier may include e.g., the number of physical channels transmitted on the carrier, their gain factors, their spreading factor and spreading codes, and the like. In some embodiments, for example, the configuration of a carrier is selected by selecting a transport format (TF) for each transport channel conveyed by that carrier, such that the configuration of the carrier comprises the combination of transport formats selected for transmitting one or more transport channels on that carrier.

Regardless, the signal generation circuit 15 generally selects the configuration $\text{config}_1 \ldots \text{config}_N$ for each carrier based on the power $P'_1 \ldots P'_N$ allocated by the mobile terminal 10 to each carrier. In particular, the signal generation circuit 15 estimates the power required to transmit a carrier with each configuration in a set of possible configurations for that carrier (as defined e.g., by the base station 30). The circuit 15 then selects a configuration for each carrier as the configuration in the set of possible configurations that supports transmission at the power $P'_1 \ldots P'_N$ allocated to the carrier. Having selected a configuration for each carrier, the signal generation circuit 15 spreads and modulates data signals $d_1 \ldots d_N$ onto the N carriers in accordance with the selected configurations. The N carriers are modulated such that they occupy distinct frequency regions. The signal generation circuit 15 thereafter provides the resulting modulated carriers $x_1 \ldots x_N$ to the transmitter front-end 12.

The transmitter-front end 12 aggregates and amplifies the modulated carriers $x_1 \ldots x_N$ to form a multi-carrier uplink signal 20 that is transmitted to the base station 30 via the one or more antennas 14. In aggregating the carriers, the transmitter front-end 12 weighs together the carriers $x_1 \ldots x_N$ according to transmit powers $P''_1 \ldots P''_N$. Specifically, when transmitting with relatively low power with respect to a nominal maximum transmit power of the mobile terminal 10, such that the mobile terminal 10 has a relatively high power headroom (PH), the carriers $x_1 \ldots x_N$ are aggregated according to the power allocated them (i.e., $P''_1 \ldots P''_N = P'_1 \ldots P'_N$). With a relatively low PH, though, aggregation and amplification of the carriers $x_1 \ldots x_N$ in accordance with the power $P'_1 \ldots P'_N$ allocated to them may not be possible. This may be because e.g., the mobile terminal is not able, or allowed, to deliver this total output power, or that doing so may otherwise cause the transmitter front-end 12 to leak an unacceptable level of energy into nearby frequency regions due to intermodulation distortion. The backoff and power adjustment circuit 16, therefore, determines the amount required to back off the maximum transmit power of the multi-carrier uplink signal 20 in order for the mobile terminal 10 to achieve an acceptable level of leaked energy, and adjusts the power $P'_1 \ldots P'_N$ allocated to the carriers accordingly (i.e., the sum of $P''_1 \ldots P''_N$ is less than the sum of $P'_1 \ldots P'_N$ in this case).

The backoff and power adjustment circuit 16 determines the required backoff based on the combination of configurations among the carriers and the relative power difference among the carriers. Notably, however, the comparator circuit 17 and the quantization circuit 18 of the present invention restrict the possible configurations that may be selected for each carrier when backoff may be required, thereby restricting the possible combinations of configurations among the carriers. The backoff and power adjustment circuit 16, therefore, may determine the required backoff without having to consider all possible combinations of configurations among the carriers.

More particularly, the comparator circuit 17 accepts as input the mobile terminal's power headroom PH and a pre-defined power headroom threshold $PH_{th}$. If the mobile terminal's PH falls below the $PH_{th}$, the comparator circuit 17 sends a control signal $C_s$ to the quantization circuit 18 indicating that the mobile terminal 10 is headroom limited and that backoff may therefore be required. Otherwise, the comparator circuit 17 indicates to the quantization circuit 18 via the control signal $C_s$ that the mobile terminal 10 is not headroom limited and that backoff is not required.

The quantization circuit 18 accepts as input the control signal $C_s$, a pre-defined quantization policy $Q_{pcy}$, and the power $P_1 \ldots P_N$ allocated to each carrier by the power allocation circuit 19. The power allocation circuit 19 may allocate power $P_1 \ldots P_N$ to each carrier based on e.g., power control commands from the base station 30, serving grants maintained by the mobile terminal 10 according to absolute or relative grants of power from the base station 30 and overload indicators from other base stations, or the like. Regardless, the power $P_1 \ldots P_N$ allocated to each carrier by the power allocation circuit 19 may generally have any value within a continuous range of values, or a relatively large set of discrete values, such that any configuration in the set of possible configurations for that carrier may be selected for transmission if that selection were based directly on $P_1 \ldots P_N$.

However, when the control signal $C_s$ indicates to the quantization circuit 18 that the mobile terminal 10 is headroom limited, the quantization circuit 18 quantizes the power $P_1 \ldots P_N$ allocated to each carrier of the multi-carrier uplink signal 20 according to the pre-defined quantization policy $Q_{pcy}$. Quantized according to the pre-defined quantization policy $Q_{pcy}$, the power $P'_1 \ldots P'_N$ allocated to each carrier may only have certain values e.g., in a relatively small set of discrete values, such that only some configurations in the set of possible configurations for that carrier may be selected for transmission by the signal generation circuit 15.

Thus, in one embodiment, the backoff and power adjustment circuit 16 stores the required backoff in a look-up table for only the combinations of configurations that may be selected when the mobile terminal 10 is headroom limited. This reduces the memory requirements of the mobile terminal 10 relative to storing the required backoff for all possible combinations of configurations for the carriers. Alternative embodiments that calculate the required backoff likewise require reduced computational complexity.

Conversely, when the backoff and power adjustment circuit 16 need not apply backoff to the multi-carrier uplink signal 20, the one or more processing circuits 11 permit any configuration in the set of possible configurations for a carrier to be selected for transmission. Specifically, when the control signal $C_s$ indicates to the quantization circuit 18 that the mobile terminal 10 is not headroom limited, the quantization circuit 18 refrains from quantizing the power $P_1 \ldots P_N$ allocated to each carrier of the multi-carrier uplink signal 20. In this case, the power $P'_1 \ldots P'_N$ allocated to each carrier may still have any value (i.e., $P'_1 \ldots P'_N = P_1 \ldots P_N$), and thus any configuration in the set of possible configurations for each carrier may be selected. Although this means that all combinations of configurations among the carriers will be possible, the backoff and power adjustment circuit 16 need not determine and apply backoff to the multi-carrier uplink signal 20 because the mobile terminal 10 is not headroom limited (i.e., $P''_1 \ldots P''_N = P'_1 \ldots P'_N$).

Referring briefly to the examples in FIGS. 2A-2B, the pre-defined quantization policy $Q_{pcy}$ for a dual-carrier uplink signal 20 (i.e., N=2) may be understood as a grid of permitted power allocations over the carriers. In FIG. 2A, for instance, the power $P_1$ allocated to the first carrier may generally have any value in a range 52A of possible values, and the power $P_2$ allocated to the second carrier may likewise have any value in a range 54A of possible values. The pre-defined quantization policy $Q_{pcy}$, however, defines a reduced set of values across the range 52A, 54A of possible values for each carrier that the power $P'_1, P'_2$ allocated to that carrier may have, resulting in a grid 50A of permitted power allocations over the first and second carriers. Thus, for a given power allocation $(P_1, P_2)$ across the carriers, the quantization circuit 18 in one embodiment quantizes that power allocation $(P_1, P_2)$ to the nearest permitted power allocation $(P'_1, P'_2)$ as specified by the grid 50A.

In some embodiments, the quantization circuit 18 is configured to restrict the maximum power allocated to one or more of the carriers. In the embodiment shown in FIG. 2B, for example, the pre-defined quantization policy $Q_{pcy}$ defines a maximum value $Max_1$, $Max_2$ for the power $P'_1, P'_2$ allocated to each carrier. By defining such a maximum value $Max_1$, $Max_2$, the pre-defined quantization policy $Q_{pcy}$ defines a reduced set of values over only a part of the range 52B, 54B of possible values for each carrier, resulting in a grid 50B of permitted power allocations over the first and second carriers.

If the maximum power that would otherwise be allocated to a carrier exceeds the maximum permitted power for that carrier, as would be the case with the power $P_1$ allocated to the first carrier in the power allocation $(P_1, P_2)$ shown outside the grid 50B, the quantization circuit 18 in one embodiment reduces the power allocated to that carrier. In the example of FIG. 2B, for instance, the quantization circuit 18 reduces the power $P_1$ allocated to the first carrier so that the power allocation $(P_1, P_2)$ may be quantized to the nearest permitted power allocation $(P'_1, P'_2)$ defined within the grid 50B.

In other embodiments, the quantization circuit 18 is configured to restrict the difference between the powers allocated to different carriers. In the embodiment shown in FIG. 2C, for example, the pre-defined quantization policy $Q_{pcy}$ defines a reduced set of values over a part of the range 52C, 54C of possible values for each carrier, resulting in a grid 50C of permitted power allocations over the first and second carriers. The grid 50C in effect specifies a maximum permitted difference between the power $P'_1$ allocated to the first carrier and the power $P'_2$ allocated to the second carrier.

Those skilled in the art will readily appreciate that the difference between the powers allocated to different carriers may be restricted using any measure relating the size of these quantities. For example, in some embodiments, a logarithm is applied to the absolute powers allocated the carriers and the difference between the powers (in the logarithm domain) restricted. In other embodiments, the difference between the powers allocated the carriers is equivalently restricted (in the linear domain) by restricting the ratio of the absolute powers.

Regardless, if the difference between the power $P'_1$ that would otherwise be allocated to the first carrier and the power $P'_2$ that would otherwise be allocated to the second carrier exceeds the maximum permitted difference, as would be the case with the power allocation $(P_1, P_2)$ shown outside the grid 50C, the quantization circuit 18 in one embodiment reduces the power allocated to the carrier allocated the most power. In the example of FIG. 2C, for instance, the quantization circuit 18 reduces the power $P_1$ allocated to the first carrier so that the power allocation $(P_1, P_2)$ may be quantized to the nearest permitted power allocation $(P'_1, P'_2)$ defined within the grid 50C.

To reduce the power allocated to the carrier allocated the most power, the quantization circuit 18 in one embodiment reduces the power allocated to a certain traffic channel of that carrier. In High-Speed Uplink Packet Access (HSUPA), for example, the quantization circuit 18 may reduce the power allocated to the E-DCH Dedicated Physical Data Channel (E-DPDCH) of a carrier. More particularly, in HSUPA the power allocation circuit 19 allocates power to the E-DPDCH of a carrier in accordance with a permitted power gain factor (also referred to specifically in HSUPA as a □ serving grant□). The permitted power gain factor specifies the permitted E-DPDCH power of a carrier relative to the Dedicated Physical Control Channel (DPCCH) of that carrier. Accordingly, the quantization circuit 18 may reduce the power allocated to the E-DPDCH of a carrier by reducing the permitted power gain factor for that carrier.

If the traffic channel has not been allocated much power, however, reducing the power allocated to that traffic channel may not reduce the total power allocated to the carrier enough to comply with the maximum permitted difference specified by the grid 50C. In some embodiments, therefore, the quantization circuit 18 reduces the power allocated to a control channel of the carrier if the permitted power gain factor for a traffic channel falls below a pre-defined threshold. Continuing the above example with regard to HSUPA, for instance, the quantization circuit 18 may reduce the power allocated to the DPCCH of the carrier if the permitted power gain factor for the E-DPDCH falls below a pre-defined grant threshold. Reducing power allocated to the DPCCH of the carrier in effect reduces the total power of the carrier in proportion to the permitted power gain factors specified for the other channels of the carrier (because the permitted power gain factors of other channels define the power of the other channels relative to that of the DPCCH). Reducing the power allocated to a control channel such as the DPCCH may require the quantization circuit 18 to override power control commands sent from the base station 30 for controlling the power received on that control channel.

In view of the above discussion, those skilled in the art will appreciate other embodiments for quantizing power allocated to each carrier of the multi-carrier uplink signal 20. In some embodiments, for example, the one or more processing circuits 11 are configured to quantize a permitted power gain factor for one or more channels of each carrier instead of, or in addition to, quantizing the total power allocated to each carrier as illustrated in FIGS. 1-2. By quantizing a permitted power gain factor for one or more channels of each carrier, the one or more processing circuits 11 restrict the configurations that may be selected for those channels and thereby indirectly restrict the configurations that may be selected for the carrier as a whole.

Figure 3:
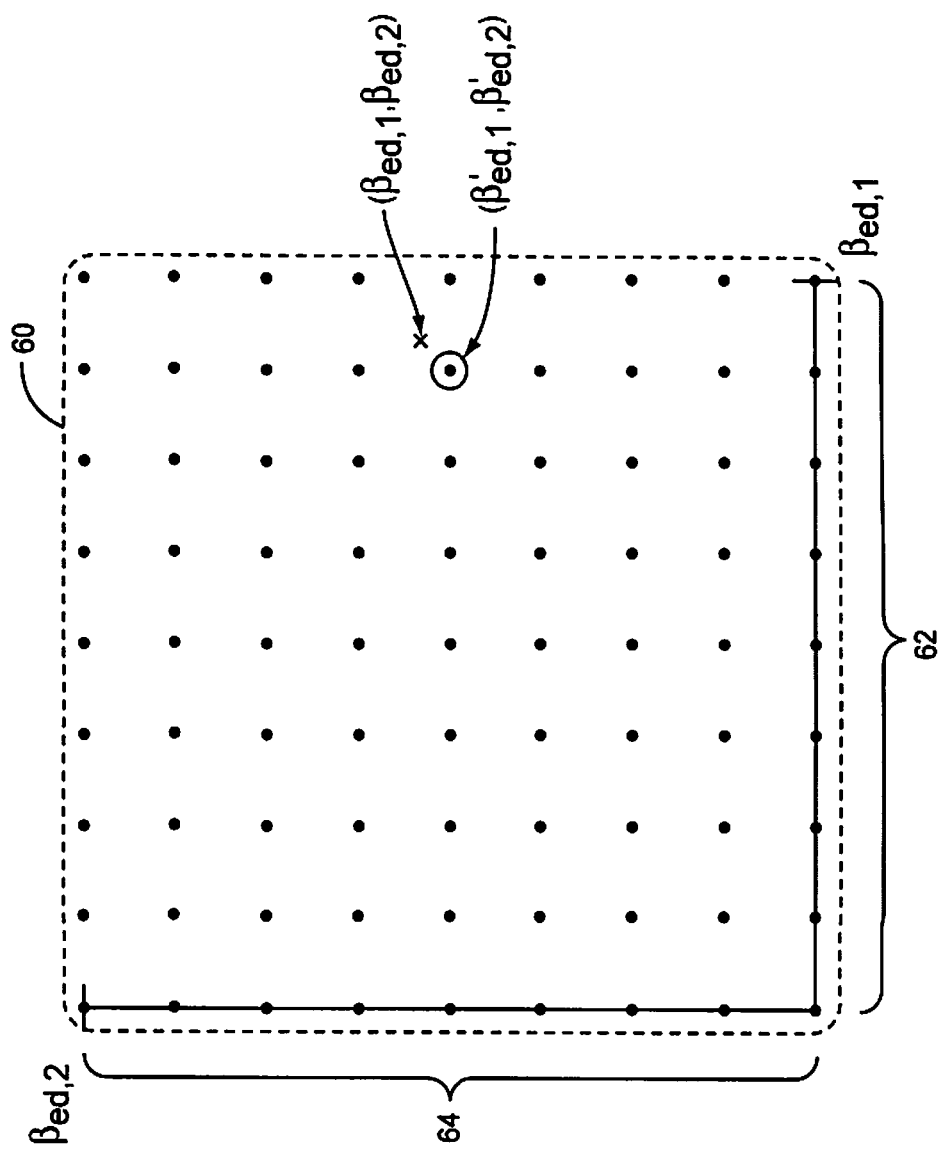
FIG. 3 illustrates an example of a pre-defined quantization policy according to another embodiment of the present invention.

The example in FIG. 3 illustrates a pre-defined quantization policy $Q_{pcy}$ for a dual-carrier HSPA uplink signal 20 as a grid 60 of allowed permitted power gain factors $\beta_{ed}$ for the E-DPDCH of each carrier. Specifically, the permitted power gain factor $\beta_{ed,1}$ for the E-DPDCH of the first carrier may generally have any value in a range 62 of possible values, and the permitted power gain factor $\beta_{ed,2}$ for the E-DPDCH of the second carrier may likewise have any value in a range 64 of possible values. The pre-defined quantization policy $Q_{pcy}$, however, defines a reduced set of values across the range 62, 64 of possible values for each carrier that the permitted power gain factor $\beta'_{ed,1}, \beta'_{ed,2}$ of that carrier is allowed to have, resulting in a grid 60 of allowed permitted power gain factors over the first and second carriers. Thus, for a given set of permitted power gain factors $(\beta_{ed,1}, \beta'_{ed,2})$ across the carriers, the quantization circuit 18 in one embodiment quantizes that set of permitted power gain factors $(\beta_{ed,1}, \beta_{ed,2})$ to the nearest allowed set of permitted power gain factors $(\beta'_{ed,1}, \beta'_{ed,2})$ as specified by the grid 60.

Of course, the quantization circuit 18 may similarly be configured to restrict the maximum permitted power gain factors for one or more channels of a carrier, or to restrict the ratio between the permitted power gain factors for one or more channels of different carriers, in an analogous manner to that described above with respect to the total power of the carriers. Although not shown in FIG. 3, therefore, the quantization circuit 18 may restrict the maximum permitted $\beta'_{ed,1}, \beta'_{ed,2}$ for the E-DPDCH of the carriers in much the same way as that described for the total power allocated to the carriers in FIG. 2B, or restrict the ratio between the $\beta'_{ed,1}$, $\beta'_{ed,2}$ for the E-DPDCH of each carrier in much the same way as that described for the total power allocated to the carriers in FIG. 2C. Of course, those skilled in the art will again readily appreciate that the ratio between the power gain factors may be restricted using any measure relating the size of these quantities.

Regardless of the manner in which the quantization policy $Q_{pcy}$ quantizes power allocated to each carrier of the multi-carrier uplink signal 20, the quantization policy $Q_{pcy}$ and/or the pre-defined power headroom threshold $PH_{th}$ may each be pre-configured in the mobile terminal 10 or signaled to the mobile terminal 10 by the base station 30.

In one embodiment, for example, the pre-defined power headroom threshold $PH_{th}$ used by the comparator circuit 17 for determining whether the mobile terminal 10 is headroom limited remains pre-configured in the mobile terminal 10. In this case, the mobile terminal 10 may store one $PH_{th}$ in memory, or may store multiple $PH_{th}$ in memory and autonomously decide which $PH_{th}$ to use for determining whether the mobile terminal 10 is headroom limited without an indication of such from the base station 30. Regardless, the $PH_{th}$ may be pre-configured based on e.g., the power capabilities of that specific mobile terminal 10. Pre-configuring the $PH_{th}$ in the mobile terminal 10 avoids loading the air interface between the mobile terminal 10 and the base station 30 with additional control signaling, but lacks the flexibility that can be provided if the base station 30 were to dynamically indicate the $PH_{th}$ to the mobile terminal 10.

In another embodiment, therefore, the base station 30 sends an indication of the $PH_{th}$ to the mobile terminal 10. This indication may be the actual $PH_{th}$ that the mobile terminal 10 should use, or some indirect identifier thereof. An example of such an embodiment is illustrated in FIG. 1.

In FIG. 1, the base station 30 includes a receiver front-end 31, one or more processing circuits 32, a transmitter front-end 33, and one or more antennas 34. The receiver front-end 31 of the base station 30 receives the multi-carrier uplink signal 20 via the one or more antennas 31 and provides that signal 20 to the one or more processing circuits 32. The transmitter front-end 33 sends an indication of the $PH_{th}$ to the mobile terminal 10 by transmitting that indication over a downlink signal 40 via the one or more antennas 34. The receiver front-end 13 of the mobile terminal 10 receives this indication and provides it to the one or more processing circuits 11 of the mobile terminal 10, and ultimately to the comparator circuit 17.

More particularly, the downlink signal 40 transmitted from the base station 30 may carry an indication of the $PH_{th}$ to the mobile terminal 10 over a channel dedicated to the mobile terminal 10, or over a channel broadcasted to a plurality of mobile terminals. If transmitted over a dedicated channel, the base station 30 may provide an indication of the $PH_{th}$ that is specific to each mobile terminal based on e.g., the power capabilities and radio environment of that specific mobile terminal. Alternatively, if transmitted over a broadcast channel, the base station 30 may either signal the same indication of the $PH_{th}$ to all mobile terminals served by that base station 30, or signal different indications to each group of mobile terminals that have e.g., certain power capabilities. Of course, if the density of currently served mobile terminals that are capable of transmitting a multi-carrier uplink signal 20 is low, or falls below some threshold, the base station 30 may dynamically switch to transmitting the indication over dedicated channels to reduce signaling overhead.

In an analogous manner, the quantization policy $Q_{pcy}$ in one embodiment is pre-configured in the mobile terminal 10, in addition to or instead of the $PH_{th}$ being pre-configured in the mobile terminal 10. The mobile terminal 10 may store one $Q_{pcy}$ in memory, or may store multiple $Q_{pcy}$ in memory and autonomously decide which $Q_{pcy}$ to use for quantizing the power allocated to each carrier without an indication of such from the base station 30. Regardless, the $Q_{pcy}$ may be pre-configured based on e.g., the power capabilities of that specific mobile terminal 10. Pre-configuring the $Q_{pcy}$ in the mobile terminal 10 avoids loading the air interface between the mobile terminal 10 and the base station 30 with additional control signaling, but lacks the flexibility that can be provided if the base station 30 were to dynamically signal the $Q_{pcy}$ to the mobile terminal 10.

To provide such flexibility, the base station 30 in other embodiments sends an indication of the $Q_{pcy}$ to the mobile terminal 10. This indication may be the actual $Q_{pcy}$ that the mobile terminal uses to quantize power allocations, or some indirect identifier thereof (e.g., the mobile terminal 10 may store multiple $Q_{pcy}$ indexed in memory whereby the base station sends a specific index to the mobile terminal 10). An example of such an embodiment is also illustrated in FIG. 1.

In FIG. 1, the transmitter front-end 33 of the base station 30 sends an indication of the $Q_{pcy}$ to the mobile terminal 10 in the same way as described above with respect to the $PH_{th}$; namely, by transmitting that indication over the downlink signal 40. Similarly, the downlink signal 40 may carry an indication of the $Q_{pcy}$ to the mobile terminal 10 over a channel dedicated to the mobile terminal 10, or over a channel broadcasted to a plurality of mobile terminals. If transmitted over a dedicated channel, the base station 30 may provide an indication of the $Q_{pcy}$ that is specific to each mobile terminal based on e.g., the power capabilities and radio environment of that specific mobile terminal. Alternatively, if transmitted over a broadcast channel, the base station 30 may either signal the same indication of the $Q_{pcy}$ to all mobile terminals served by that base station 30, or signal different indications to each group of mobile terminals that e.g., have certain power capabilities and/or experience certain radio environments. Of course, if the density of currently served mobile terminals that are capable of transmitting a multi-carrier uplink signal 20 is low, or falls below some threshold, the base station 30 may dynamically switch to transmitting the indication over dedicated channels to reduce signaling overhead.

In embodiments such as these where a base station 30 sends an indication of the $Q_{pcy}$ to the mobile terminal 10, different base stations may be configured with different $Q_{pcy}$ depending e.g., on the radio environment at each base station. To mitigate inconsistent behavior when the mobile terminal 10 moves between different base stations, therefore, the mobile terminal 10 may be pre-configured with, or sent an indication of, a default $Q_{pcy}$. For example, the mobile terminal 10 is configured in one embodiment to identify the default $Q_{pcy}$ as the $Q_{pcy}$ to use when the mobile terminal 10 is engaged in a soft handoff between base stations. This avoids the ambiguity which would otherwise be created if the mobile terminal 10 were to receive an indication of one $Q_{pcy}$ from the source base station and an indication of a different $Q_{pcy}$ from the target base station during the soft handoff. In another embodiment, the mobile terminal 10 also uses a default $Q_{pcy}$ when it is unable to receive any indication of which $Q_{pcy}$ to use e.g., such as during a hard handoff between base stations or during a Serving Radio Network Controller (SRNC) relocation. In view of the above described variations and modifications, therefore, the mobile terminal 10 is generally configured to identify one of a plurality of $Q_{pcy}$ as the $Q_{pcy}$ to use based on whether the mobile terminal 10 is engaged in a handoff (whether hard or soft) between base stations.

As described thus far, the mobile terminal 10 is configured to quantize the power allocated to each carrier of the multi-carrier uplink signal 20 according to the $Q_{pcy}$, however obtained, if the mobile terminal 10 is headroom limited. With the power allocated to each carrier quantized in this way, a reduced number of configurations for each carrier are possible. Although the reduced number of configurations relieves the memory requirements and/or computational complexity for determining the required backoff, it also somewhat degrades the ability of the mobile terminal 10 to maximize the attainable data rate by selecting the best configuration appropriate for the current channel conditions.

Accordingly, the power allocation circuit 19 of the mobile terminal 10 is configured in one embodiment to allocate power $P_1 \ldots P_N$ to each carrier based on one or more pre-defined prioritization criteria associated with the channel conditions of the carriers. By allocating power based on these prioritization criteria, the power allocation circuit 19 allocates more power $P_1 \ldots P_N$ to those carriers with more favorable channel conditions.

The power allocation circuit 19 may utilize any type of criteria for prioritizing power allocations to the carriers, as long as that criteria indicates the channel conditions of the carriers. In one embodiment, the pre-defined prioritization criteria includes the power on one or more power-controlled control channels of a carrier, such as the power on the DPCCH in HSUPA. By allocating power to the carriers that have the lowest DPCCH power first, for example, the power allocation circuit 19 allocates more power to those carriers that experience more favorable path loss and interference conditions. In other embodiments, the pre-defined prioritization criteria may include the serving grant of each carrier, the power of a control channel per serving grant of each carrier, or the like.

Regardless, the pre-defined prioritization criteria may be pre-configured in the mobile terminal 10 or indicated to the mobile terminal 10 by the base station 30. In embodiments where the prioritization criteria is pre-configured in the mobile terminal 10, the mobile terminal 10 may store a single criteria in memory, or may store multiple criteria in memory and autonomously decide which criteria to use without an indication of such from the base station 30. This decision may be based on e.g., the $Q_{pcy}$ being used by the mobile terminal 10 to quantize the power allocated to each carrier, such that certain prioritization criteria are used for certain $Q_{pcy}$. As with other instances, pre-configuring the prioritization criteria in the mobile terminal 10 avoids loading the air interface between the mobile terminal 10 and the base station 30 with additional control signaling, but lacks the flexibility that can be provided if the base station 30 were to dynamically indicate the criteria to the mobile terminal 10.

In other embodiments, therefore, the base station 30 sends an indication of the pre-defined prioritization criteria to the mobile terminal 10. This indication may be the actual criteria that the mobile terminal 10 should use, or some indirect identifier thereof. Moreover, the base station 30 may send this indication to the mobile terminal 10 over a broadcast channel in such a way that all mobile terminals served by the base station 30 allocate power to carriers using the same prioritization criteria, regardless of whether or not those mobile terminals use the same $Q_{pcy}$. Alternatively, the base station 30 may send the indication to the mobile terminal over either a broadcast channel or a dedicated channel in such a way that all mobile terminals served by the base station 30 and using a particular $Q_{pcy}$ allocate power to carriers using the same prioritization criteria. In this case, the prioritization criteria may be indicated in conjunction with that of the $Q_{pcy}$ (e.g., associated with a particular index of $Q_{pcy}$ stored in the mobile terminal 10).

In any case, the base station 30 may send an indication of the prioritization criteria to the mobile terminal 10 via an information element (IE) in a radio link control message. When this IE is present, of course, the mobile terminal 10 is configured to allocate power in accordance with the prioritization criteria indicated. When the IE is not present, however, the mobile terminal 10 may be configured either to allocate power in accordance with a default prioritization criteria or to allocate power without regard to any prioritization criteria.

With the above points of variation and implementation of the base station 30 and mobile terminal 10 in mind, those skilled in the art will appreciate that the base station 30 and mobile terminal 10 of the present invention generally perform the methods illustrated in FIGS. 4 and 5, respectively. According to FIG. 4, the base station 30 sends an indication of the pre-defined quantization policy $Q_{pcy}$ to the mobile terminal 10 (Block 100). The base station 30 may also send an indication of the pre-defined power headroom threshold $PH_{th}$ and/or the pre-defined prioritization criteria to the mobile terminal 10.

According to FIG. 5, the mobile terminal 10 determines whether the power headroom of the mobile terminal 10 falls below the pre-defined power headroom threshold $PH_{th}$ (which may or may not be sent from the base station 30 as described above) (Block 200). If so, the mobile terminal 10 quantizes power allocated to each carrier of the multi-carrier uplink signal 20 according to the pre-defined quantization policy $Q_{pcy}$ (which also may or may not be sent from the base station 30 as described above) (Block 210).

Of course, all of the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method in a mobile terminal configured to transmit a multi-carrier uplink signal to a base station, the multi-carrier uplink signal being an aggregation of two or more separately modulated carriers occupying distinct frequency regions, the method comprising:

determining whether a power headroom of the mobile terminal falls below a pre-defined power headroom threshold, indicating that the mobile terminal is headroom limited;

if the mobile terminal is not headroom limited, permitting power allocated to each carrier to be selected from first values within a range; and if the mobile terminal is headroom limited, quantizing power allocated to each carrier of the multi-carrier uplink signal according to a pre-defined quantization policy, wherein the pre-defined quantization policy requires the power allocated to each carrier to be selected from second values within a range, the second values being a restricted set of the first values.

2. The method according to claim 1, further comprising selecting a configuration for each carrier based on the quantized power allocated to that carrier, when the mobile terminal is headroom limited.

3. The method according to claim 2, the method further comprising determining a power backoff for the mobile terminal based on the selected configuration of the multi-carrier uplink signal.

4. The method according to claim 3, wherein the determination of the power backoff comprises performing a look-up in a backoff table comprising a list of carrier configurations and associated backoff values, the backoff table being based on pre-defined quantised power allocations to each carrier of the multi-carrier uplink signal.

5. The method according to claim 1, further comprising receiving an indication of at least one of the pre-defined power headroom threshold and the pre-defined quantization policy from the base station over a broadcast channel.

6. The method according to claim 1, further comprising receiving an indication of at least one of the pre-defined power headroom threshold and the pre-defined quantization policy from the base station over a dedicated channel.

7. The method according to claim 1, further comprising identifying one of a plurality of quantization policies as the pre-defined quantization policy based on whether the mobile terminal is engaged in a handoff between base stations.

8. The method according to claim 1, further comprising allocating power to each carrier based on one or more pre-defined prioritization criteria associated with the channel conditions of the carriers.

9. The method according to claim 8, further comprising receiving an indication of said pre-defined prioritization criteria via an information element in a radio link control message received from the base station.

10. The method according to claim 1, wherein quantizing power allocated to each carrier of the multi-carrier uplink signal according to the pre-defined quantization policy comprises restricting the difference between the powers allocated to different carriers.

11. The method according to claim 10, wherein restricting the difference between the power allocated to different carriers comprises reducing the power allocated to the carrier allocated the most power if the difference between the power allocated to that carrier and another carrier exceeds a maximum permitted difference.

12. The method according to claim 11, wherein reducing the power allocated to the carrier allocated the most power comprises reducing the power allocated to a control channel of the carrier allocated the most power if a permitted power gain factor for a traffic channel of that carrier falls below a pre-defined grant threshold.

13. The method according to claim 1, wherein quantizing power allocated to each carrier of the multi-carrier uplink signal according to the pre-defined quantization policy comprises quantizing a permitted power gain factor for one or more channels of each carrier according to the pre-defined quantization policy.

14. The method according to claim 1, wherein quantizing power allocated to each carrier of the multi-carrier uplink signal according to the pre-defined quantization policy comprises restricting the ratio between permitted power gain factors for one or more channels of different carriers.

15. A mobile terminal comprising:
one or more antennas configured to transmit a multi-carrier uplink signal to a base station, the multi-carrier uplink signal being an aggregation of two or more separately modulated carriers occupying distinct frequency regions; and
one or more processing circuits configured to:
determine whether a power headroom of the mobile terminal falls below a pre-defined power headroom threshold, indicating that the mobile terminal is headroom limited;
if the mobile terminal is not headroom limited, permitting power allocated to each carrier to be selected from first values within a range; and
if the mobile terminal is headroom limited, quantize power allocated to each carrier of the multi-carrier uplink signal according to a pre-defined quantization policy, wherein the pre-defined quantization policy requires the power allocated to each carrier to be selected from second values within a range, the second values being a restricted set of the first values.

16. The mobile terminal according to claim 15, wherein the processing circuits are further configured to select a configuration for each carrier based on the quantized power allocated to that carrier, when the mobile terminal is headroom limited.

17. The mobile terminal according to claim 16, comprising determining a power backoff based on the selected configuration of the multi-carrier uplink signal.

18. The mobile terminal according to claim 17, wherein the determination of the power backoff comprises performing a look-up in a backoff table comprising a list of carrier configurations and associated backoff values, the backoff table being based on pre-defined quantised power allocations to each carrier of the multi-carrier uplink signal.

19. The mobile terminal according to claim 15, wherein the processing circuits are further configured to receive an indication of at least one of the pre-defined power headroom threshold and the pre-defined quantization policy from the base station over a broadcast channel.

20. The mobile terminal according to claim 15, wherein the processing circuits are further configured to receive an indication of at least one of the pre-defined power headroom threshold and the pre-defined quantization policy from the base station over a dedicated channel.

21. The mobile terminal according to claim 15, wherein the processing circuits are further configured to identify one of a plurality of quantization policies as the pre-defined quantization policy based on whether the mobile terminal is engaged in a handoff between base stations.

22. The mobile terminal according to claim 15, wherein the processing circuits are further configured to allocate power to each carrier based on one or more pre-defined prioritization criteria associated with the channel conditions of the carriers.

23. The mobile terminal according to claim 22, wherein the processing circuits are further configured to receive an indication of said pre-defined prioritization criteria via an information element in a radio link control message received from the base station.

* * * * *